United States Patent
Parker et al.

(10) Patent No.: US 8,990,477 B2
(45) Date of Patent: Mar. 24, 2015

(54) SYSTEM AND METHOD FOR LIMITING FRAGMENTATION

(75) Inventors: Liam M. Parker, Edinburgh (GB); Sergey A. Gorobets, Edinburgh (GB)

(73) Assignee: SanDisk Technologies Inc., Plano, TX (US)

( * ) Notice: Subject to any disclaimer, the term of this patent is extended or adjusted under 35 U.S.C. 154(b) by 281 days.

(21) Appl. No.: 13/451,182

(22) Filed: Apr. 19, 2012

(65) Prior Publication Data

US 2013/0282955 A1 Oct. 24, 2013

(51) Int. Cl.
 *G06F 12/00* (2006.01)
 *G06F 13/00* (2006.01)
 *G06F 13/28* (2006.01)
 *G06F 12/02* (2006.01)

(52) U.S. Cl.
 CPC .... *G06F 12/0246* (2013.01); *G06F 2212/7205* (2013.01)
 USPC ............................ 711/103; 711/154; 711/171

(58) Field of Classification Search
 CPC .................. G06F 12/0246; G06F 2212/1016; G06F 2212/7205
 USPC ......................................... 711/103, 154, 171
 See application file for complete search history.

(56) References Cited

U.S. PATENT DOCUMENTS

| | | | |
|---|---|---|---|
| 6,101,125 A | 8/2000 | Gorman | |
| 7,721,059 B2 * | 5/2010 | Mylly et al. | 711/165 |
| 7,849,253 B2 | 12/2010 | Stewart | |
| 2008/0077762 A1 | 3/2008 | Scott et al. | |
| 2009/0094433 A1 * | 4/2009 | Thomas et al. | 711/172 |
| 2009/0248965 A1 * | 10/2009 | Lee et al. | 711/103 |
| 2009/0327591 A1 * | 12/2009 | Moshayedi | 711/103 |
| 2010/0042773 A1 | 2/2010 | Yeh | |
| 2010/0122016 A1 * | 5/2010 | Marotta et al. | 711/103 |
| 2010/0161936 A1 * | 6/2010 | Royer et al. | 711/209 |
| 2011/0029715 A1 | 2/2011 | Hu et al. | |
| 2011/0099326 A1 | 4/2011 | Jung et al. | |
| 2011/0191523 A1 * | 8/2011 | Caulkins | 711/103 |
| 2011/0238899 A1 | 9/2011 | Yano et al. | |
| 2011/0314204 A1 * | 12/2011 | Ootsuka et al. | 711/103 |
| 2012/0079174 A1 * | 3/2012 | Nellans et al. | 711/103 |
| 2012/0173827 A1 * | 7/2012 | Wood et al. | 711/154 |
| 2012/0311293 A1 * | 12/2012 | Nemazie et al. | 711/171 |
| 2013/0060991 A1 * | 3/2013 | Lee et al. | 711/103 |

OTHER PUBLICATIONS

U.S. Appl. No. 13/338,941, filed Dec. 28, 2011 (29 pages).

* cited by examiner

*Primary Examiner* — Ryan Bertram
(74) *Attorney, Agent, or Firm* — Brinks Gilson & Lione

(57) ABSTRACT

A method and system are disclosed for controlling the storage of data in a storage device to reduce fragmentation. The method may include a controller of a storage device receiving data for storage in non-volatile memory, proactively preventing fragmentation by only writing an amount of sequentially addressed logical groups of data into a main storage area of the storage device, such as multi-level cell (MLC) flash memory, and reactively defragmenting data previously written into the MLC memory when a trigger event is reached. The system may include a storage device with a controller configured to perform the method noted above, where the thresholds for minimum sequential writes into MLC, and for scanning the memory for fragmented data and removing fragmentation by re-writing the fragmented data already in MLC into new MLC blocks, may be fixed or variable.

25 Claims, 11 Drawing Sheets

SYSTEM AND METHOD FOR LIMITING FRAGMENTATION

TECHNICAL FIELD

This application relates generally to a method and system for managing the storage of data in a data storage device.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. These memory systems typically work with data units called "pages" that can be written, and groups of pages called "blocks" that can be read and erased, by a storage manager often residing in the memory system.

A non-volatile memory system may develop problems with efficiency as it becomes more filled with data. Over time, data associated with sequential logical addresses can become scattered over different physical locations in the memory. This fragmentation of the data within a memory system can lead to delays in response time for the memory system as the memory fills up because fewer free blocks may be available for incoming data and the memory system may then need to attend to housekeeping operations to free up more space. The housekeeping operations require more effort by the memory system when the data that is made obsolete by incoming updated data is scattered over multiple different blocks.

BRIEF SUMMARY

In order to address the problems and challenges noted above, a system and method for handling host write commands to reduce fragmentation is disclosed.

According to a first aspect, a method for controlling storage of content on a storage device is disclosed. The method includes, in a storage device having a controller in communication with non-volatile memory, wherein the non-volatile memory comprises a first type of non-volatile memory and a second type of non-volatile memory, the controller receiving data for storage in the non-volatile memory. Upon determining that a fullness of the storage device has reached a proactive defragmentation threshold, the controller only writes sequentially addressed logical groups of received data to the second type of non-volatile memory. Upon determining that the fullness of the storage device has reached a reactive defragmentation threshold, the controller automatically defragments data already written into the second type of non-volatile memory in response to a trigger event.

In various alternative implementations, the method may include the controller determining whether host data writes are for a minimum amount of sequentially addressed logical groups, for example a cluster of sequentially addressed logical groups and routing received data directly to the second type of non-volatile memory and bypassing the first type of non-volatile memory. Also, the controller may monitor the presence of fragments of clusters in the first type of non-volatile memory and write sequentially addressed logical groups to the second type of non-volatile memory when at least a cluster's worth of sequentially addressed logical groups is available in the first type of non-volatile memory. When a sufficient amount of fragmentation has been detected in the second type of non-volatile memory, a reactive defragmentation process may be executed.

According to another aspect, a storage device is disclosed having a non-volatile memory and a controller in communication with the non-volatile memory that is configured to carry out the proactive and reactive defragmentation processes set out above. The proactive and reactive defragmentation thresholds may be the same or different. Also, data compacted in a garbage collection process may be stored in a separate block from that used for storage of reactively defragmented data, or a same block may be used to receive both compacted data writes and defragmented data writes.

In another aspect, a method for controlling storage of content on a storage device is disclosed. The method includes, in a storage device having a controller in communication with non-volatile memory, wherein the non-volatile memory comprises a first type of non-volatile memory and a second type of non-volatile memory, the controller receiving data for storage in the non-volatile memory. Upon determining that the fullness of the storage device has reached a reactive defragmentation threshold, the controller automatically defragments data already written into the second type of non-volatile memory in response to a trigger event.

Other embodiments are disclosed, and each of the embodiments can be used alone or together in combination. The embodiments will now be described with reference to the attached drawings.

DETAILED DESCRIPTION

Figure 1:
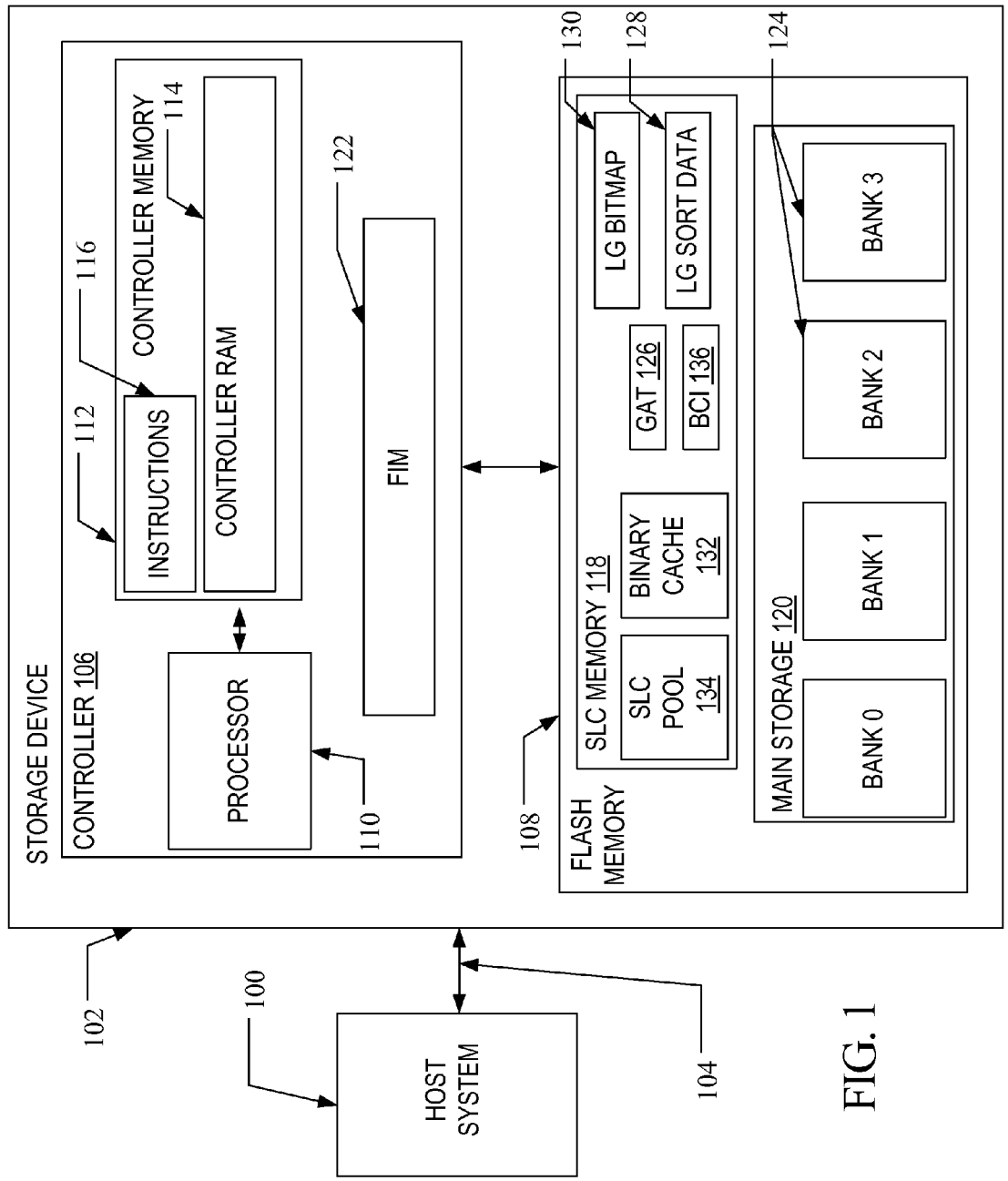
FIG. 1 illustrates a block diagram of a storage device and host according to one embodiment.

A flash memory system suitable for use in implementing aspects of the invention is shown in FIG. 1. A host system 100 stores data into, and retrieves data from, a storage device 102. The storage device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data handling devices, such as a personal computer, a mobile telephone, a personal digital assistant (PDA), or the like. The host system 100 communicates with the storage device over a communication channel 104.

The storage device 102 contains a controller 106 and a memory 108. As shown in FIG. 1, the controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory such as random access memory (RAM) 114 and/or non-volatile memory, and processor executable instructions 116 for handling memory management.

As discussed in more detail below, the storage device 102 may include functions for memory management. In operation, the processor 110 may execute memory management instructions (which may be resident in instructions 116) for operation of the memory management functions. The memory management functions may control the assignment of the one or more portions of the memory within storage device 102, such as controller memory 112. For example, memory management functions may allocate a portion of controller memory 112 for a data cache. One, some, or all of the memory management functions may be performed by one or separate elements within the storage device 102. The controller RAM 114 may include one or more data cache areas for use in optimizing write performance. The controller 106 may also include one of more flash interface modules (FIMs) 122 for communicating between the controller 106 and the flash memory 108.

The flash memory 108 is non-volatile memory and may consist of one or more memory types. These memory types may include, without limitation, memory having a single level cell (SLC) type of flash configuration, also known as binary flash, and multi-level cell (MLC) type flash memory configuration. The flash memory 108 may be divided multiple parts, for example an SLC memory 118 and a main storage area 120 made up of MLC flash, where the main storage area 120 may be further divided into multiple banks 124. Although the banks are preferably the same size, in other embodiments they may have different sizes. The storage device 102 may be arranged to have a different FIM 122 designated for each bank, or more than one bank 124 associated with a FIM 122. Each bank 124 may include one or more physical die, and each die may have more than one plane. The SLC memory 118 may contain a logical group bitmap 130 which may contain a list of valid and invalid logical groups of data stored in the flash memory 108, along with a group address table (GAT) 126 which may contain the physical location information of the logical groups. The GAT 126 and logical group bitmap 130 may be stored in the SLC Memory 118 or in another location in the storage device 102. The SLC memory 118 may also maintain a binary cache 132, an SLC pool 134, a binary cache index (BCI) 136 and, as described further below, logical group sort data 128. The controller may define the binary cache 132 and SLC Pool 134 storage areas for use in handling a specific data content type, size and purpose. In one implementation, the controller may use the binary cache 132 to store small fragments of clusters of data and the SLC pool 134 may be used to manage larger fragments of clusters and the binary working set (BWS) folding operations of data from SLC into MLC memory. Although the flash memory 108 is shown as including SLC memory 118 outside of the individual banks 124, in other implementations each bank may instead include some SLC memory where each bank would include in its SLC memory a portion of the GAT relevant to that bank.

Figure 2:
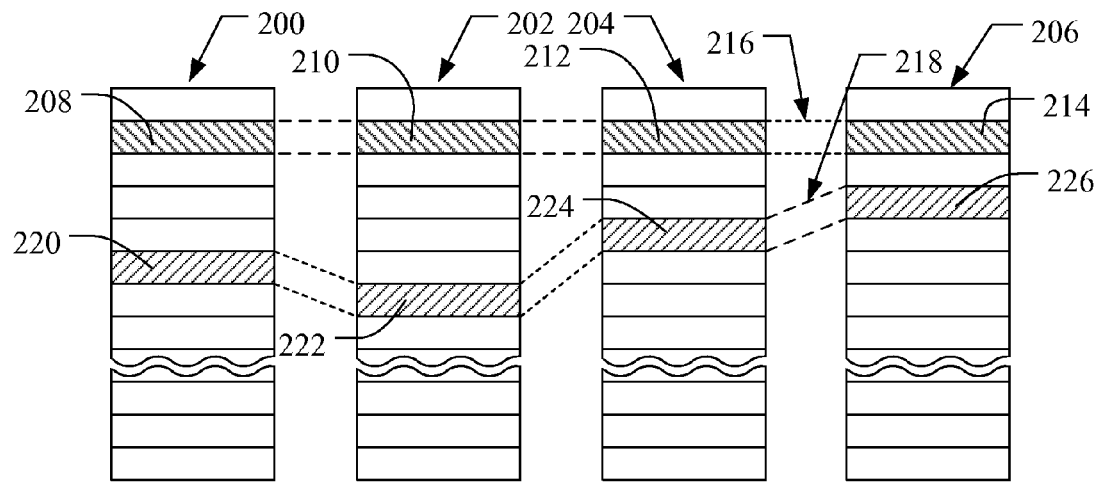
FIG. 2 illustrates an example physical memory organization of a memory bank of FIG. 1.

Each bank 124 of the flash memory 108 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 2, a conceptual illustration of a bank 124 of a representative flash memory cell array is shown. Four planes or sub-arrays 200, 202, 204 and 206 of memory cells may be on a single integrated memory cell chip (also referred to as a die), on two chips (two of the planes on each chip) or on four separate chips. The specific arrangement is not important to the discussion below and other numbers of planes may exist in a bank. The planes are individually divided into blocks of memory cells shown in FIG. 2 by rectangles, such as blocks 208, 210, 212 and 214, located in respective planes 200, 202, 204 and 206. There may be dozens or hundreds of blocks in each plane. Blocks may be logically linked together to form a metablock that may be erased as a single unit. For example, blocks 208, 210, 212 and 214 may form a first metablock 216. The blocks used to form a metablock need not be restricted to the same relative locations within their respective planes, as is shown in the second metablock 218 made up of blocks 220, 222, 224 and 226.

Figure 3:
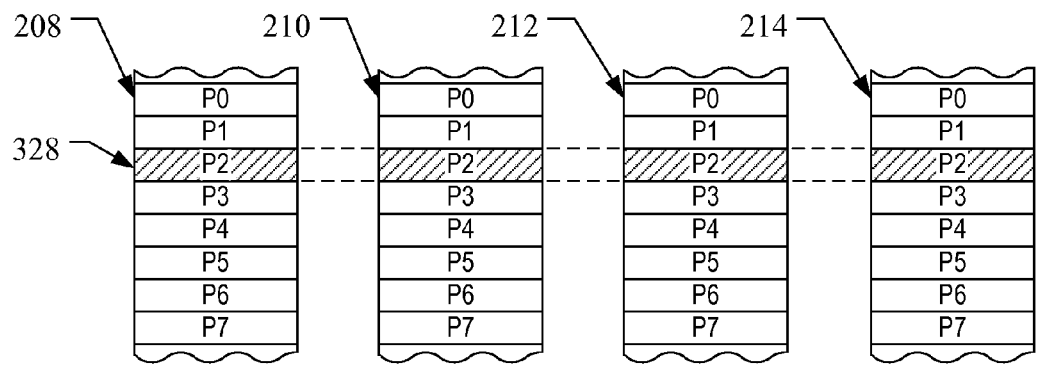
FIG. 3 shows an expanded view of a portion of the physical memory of FIG. 2.

The individual blocks are in turn divided for operational purposes into pages of memory cells, as illustrated in FIG. 3. The memory cells of each of blocks 208, 210, 212, and 214, for example, are each divided into eight pages P0-P7. Alternately, there may be 16, 32 or more pages of memory cells within each block. A page is the unit of data programming within a block, typically containing the minimum amount of data that are programmed at one time. The minimum unit of data that can be read at one time may be less than a page. A metapage 328 is illustrated in FIG. 3 as formed of one physical page for each of the four blocks 208, 210, 212 and 214. The metapage 328 includes the page P2 in each of the four blocks but the pages of a metapage need not necessarily have the same relative position within each of the blocks. A metapage may be the maximum unit of programming. The blocks disclosed in FIGS. 2-3 are referred to herein as physical blocks because they relate to groups of physical memory cells as discussed above.

As used herein, a metablock is a unit of address space defined to have a range of logical addresses the same size as one or more physical blocks. Each metablock includes one of more clusters of data, where a complete cluster is defined as containing a fixed number of multiple logical groups (LGs) and each LG includes a range of logical block address (LBAs) that are associated with data received from a host 100. A logical group may refer to any of a number of logically contiguous related groups of data. It should be noted that a logical cluster is defined herein as some multiple of logical groups that may or may not be the same as the number of logical groups that could be stored within an MLC metablock (i.e., a physical metablock). A logical cluster may be smaller than, equal to, or larger than a size of a MLC metablock.

Figure 4:
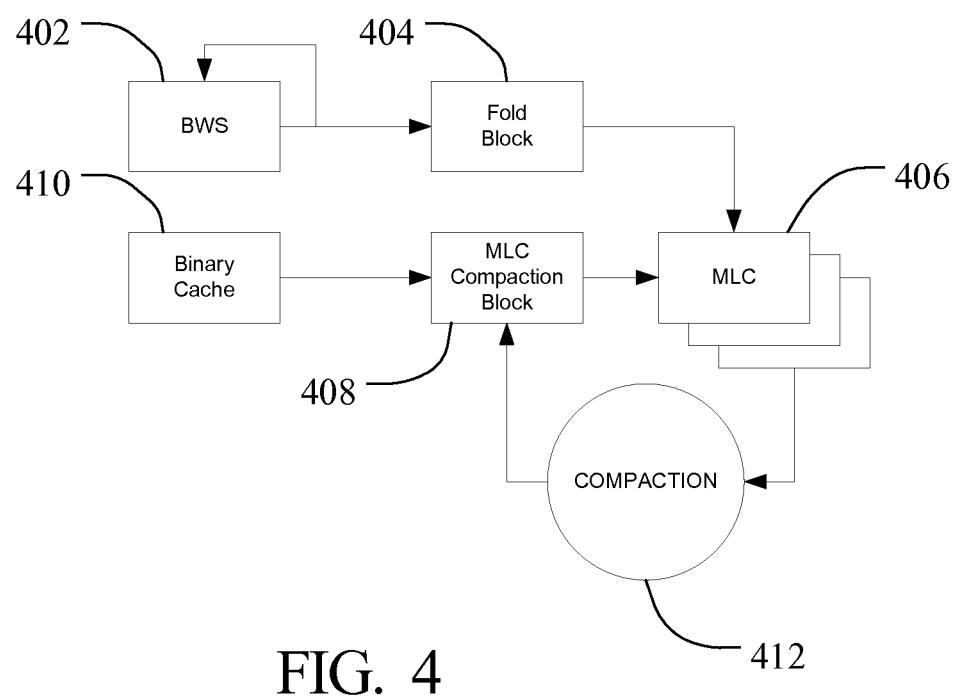
FIG. 4 shows a functional block diagram of a compaction process utilizing a storage device such as shown in FIG. 1.

In some prior flash memory systems, LGs are the same size as a physical block in the flash memory. For these prior flash memory systems, there is generally no problem with logical fragmentation because it is not possible for LGs to become fragmented in a physical block of the same size. In such a system, only a compaction process is necessary, such as is shown in FIG. 4. The compaction process, in a system where LG size is equal to physical block size involves reclamation of obsolete space in a block. A binary working set (BWS) folding operation 402 places data in a fold block 404 in a memory, which is then added to the pool of MLC blocks 406 in main memory. As data in a block is made obsolete, the valid data for MLC blocks 406 with valid and obsolete data is compacted by copying the valid data to a MLC compaction block 408 with valid data from the binary cache 410. Compaction 412 is primarily concerned with reclaiming obsolete space in a block regardless of the order of logical groups in the block. The remaining free space in a compaction block 408 is available for other write operations.

Figure 5:
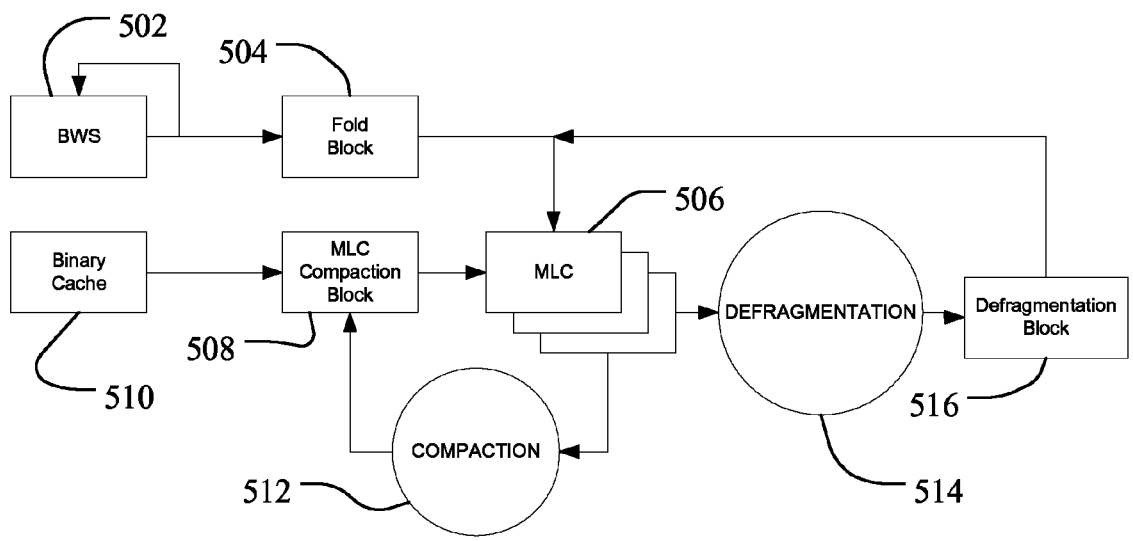
FIG. 5 shows a functional block diagram of a compaction process and a reactive defragmentation process utilizing a storage device such as shown in FIG. 1.

In flash memory systems having logical group sizes that may differ from physical block size, the added problem of fragmentation can occur. An advantage of the proactive and reactive defragmentation processes described herein is that either or both processes may be used in a storage device where logical group size, cluster size and physical block size are independent of each other. One arrangement for handling defragmentation, which relates to consolidating logical groups in order in a block, with compaction (that relates to the process of reclamation of obsolete space in a block regardless of the order of the logical groups in block) is illustrated in FIG. 5. Similar to FIG. 4, in FIG. 5 a compaction process 512 takes place that is controlled by the controller of the storage device, where a binary working set folding operation 502 places data in a fold block 504, which is then added to the pool of MLC blocks 506 in main memory. As data in a block is made obsolete, the valid data for MLC blocks 506 with valid and obsolete data is compacted by copying the valid data to a MLC compaction block 508 with valid data from the binary cache 510. A separately triggered defragmentation process 514 also takes place that consolidates sequential logical groups by copying valid data from various different sources and MLC blocks 506 into a separate defragmentation MLC block 516 where the logical groups are restored to a sequential order. In one embodiment, the compaction process 512 of removing the "holes" created by invalid data is a distinct and independent process from the reactive defragmentation process 514. The defragmentation process actually creates scattered "holes" in physical blocks by virtue of the process of copying logical groups that have been scattered over several physical blocks into a new MLC defragmentation block 516 and making obsolete the data associated with the logical group in the original block.

Figure 6:
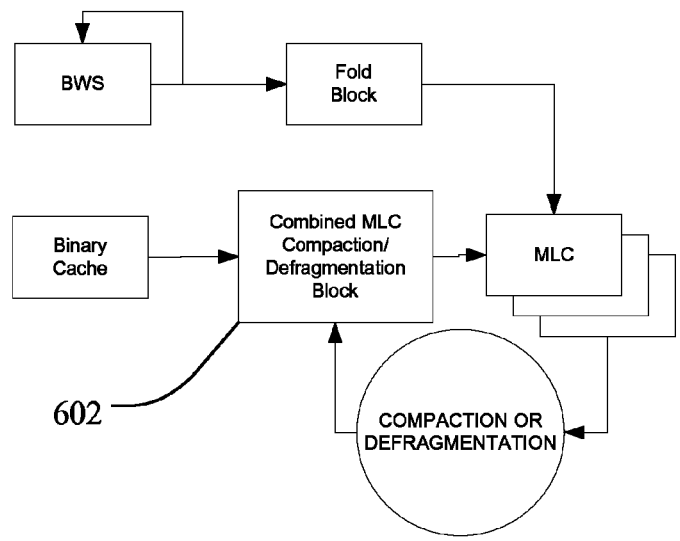
FIG. 6 is an alternative embodiment of the block diagram of FIG. 5 where compacted data and defragmented data share a same block.

In the embodiment of FIG. 5, a separate MLC compaction block 508 and a defragmentation block 516 are used by the memory system. As illustrated in FIG. 6, the same independently triggered processes of compaction and defragmentation may be utilized, but the same destination block (labeled "combined MLC compaction/defragmentation block") 602 may be used where both compacted data may be stored by the compaction process and defragmented data may be stored side-by-side.

As noted above, in a storage device where logical group size differs from physical block size, data may become fragmented, where sequentially numbered logical groups become scattered into non-contiguous physical locations in the main storage of the storage device. When this happens, and especially when the main storage 120 comes full, a subsequent write of updated data for a sequential run of logical groups corresponding to those fragmented throughout different locations in the main storage can lead to multiple housekeeping steps (e.g. compaction) to remove the invalid data from each of the different locations to make a new free block for subsequent data writes. Referring to FIGS. 7A-7G, a simplified hypothetical sequence of activity surrounding a data write to main storage of a storage device is shown, including the subsequent housekeeping steps that may be necessary in a storage device that does not implement the logical group sorting technique described herein. The added housekeeping steps may be due to the fragmentation problem in a small logical group based architecture where sequential data is no longer contiguous within a metablock. When a large write command comes in and the storage device is full, the storage device may require many back-to-back MLC compactions to free up space because the obsolete old data can be scattered over many MLC blocks. The large number of MLC compactions can lead to a long command response time.

Figure 7A:
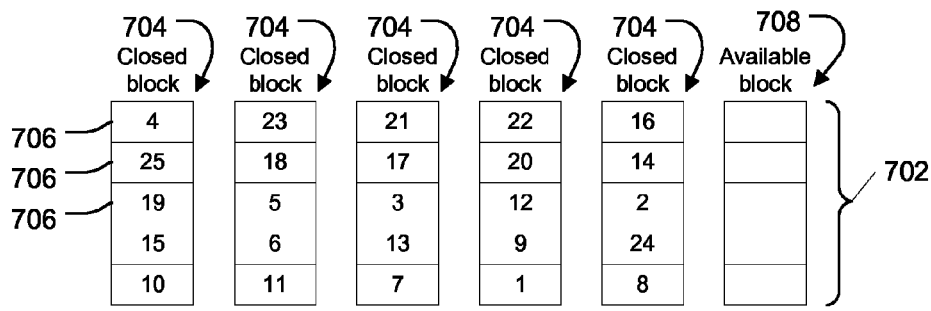
FIGS. 7A-7G illustrate an example sequence of data write and housekeeping operations in a memory that is not pre-sorted by logical groups.
Figure 7B:
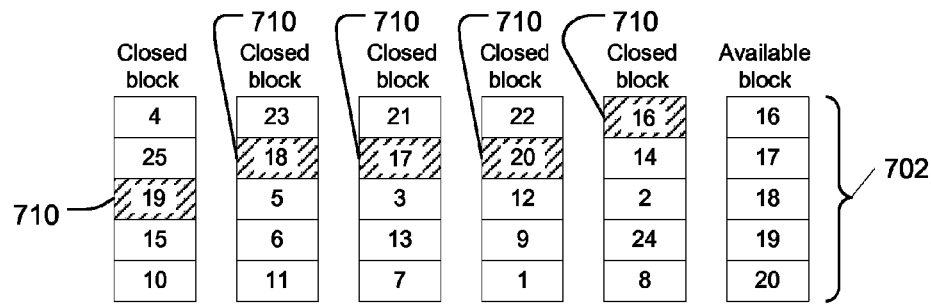
Figure 7C:
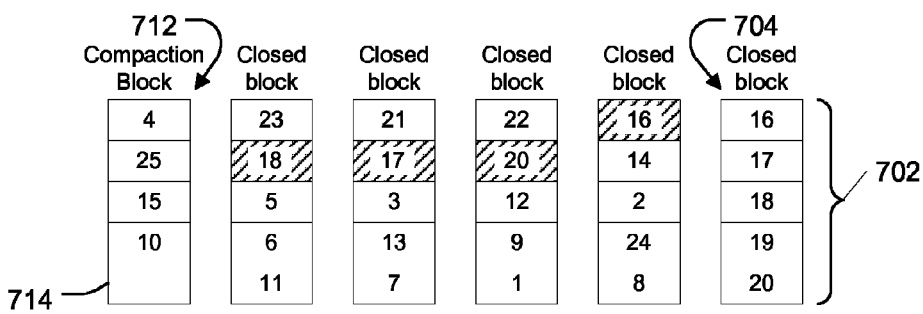

An example of the type of situation that can result in long response times is shown in FIGS. 7A-7G. In FIG. 7A an array of blocks 702 in a main storage, such as MLC flash memory, is shown when a storage device is substantially full. In this initial stage, the majority of closed blocks 704 contain logical groups 706 that are non-sequentially numbered where a number of sequential logical groups are scattered across different blocks. One free block 708 is shown that may receive new data being written to the main storage. In this situation, when a long write command comes in with updates to logical groups that span across multiple sequential logical groups, for example 5 logical groups (logical groups 16-20) to simplify this illustration, the previous instances of those logical groups now contain obsolete data. In FIG. 7B, the updated logical groups have been written to the formerly free block 708 and the obsolete data 710 in the closed blocks 704 is illustrated with cross-hashing to show how five separate blocks are affected by the data write due to the fragmentation of this particular sequence of logical groups.

Figure 7D:
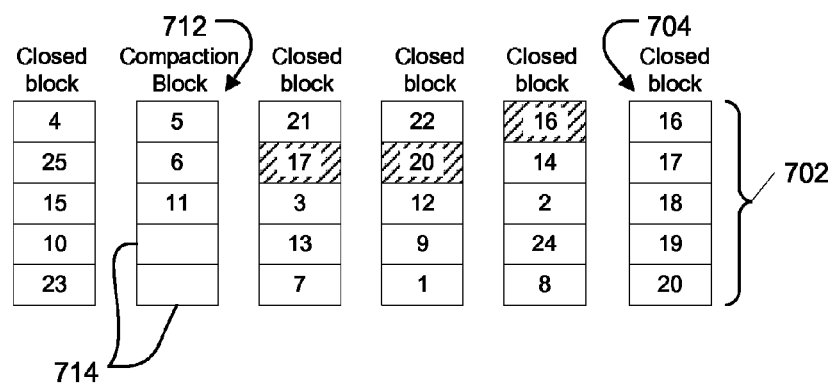
Figure 7E:
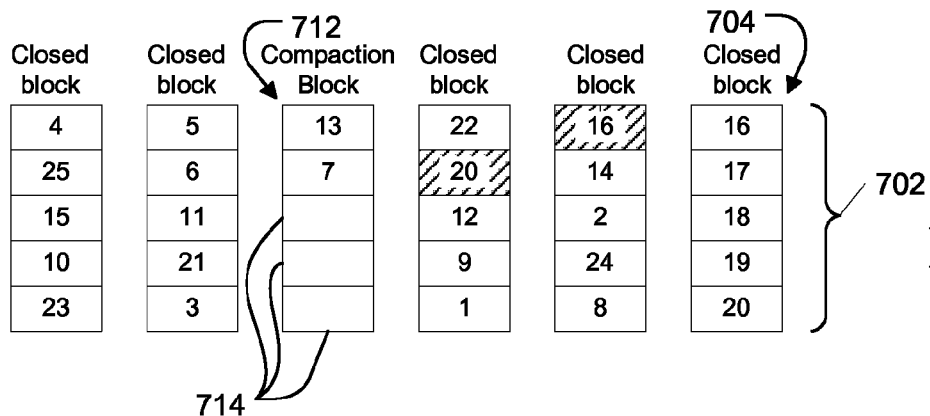
Figure 7F:
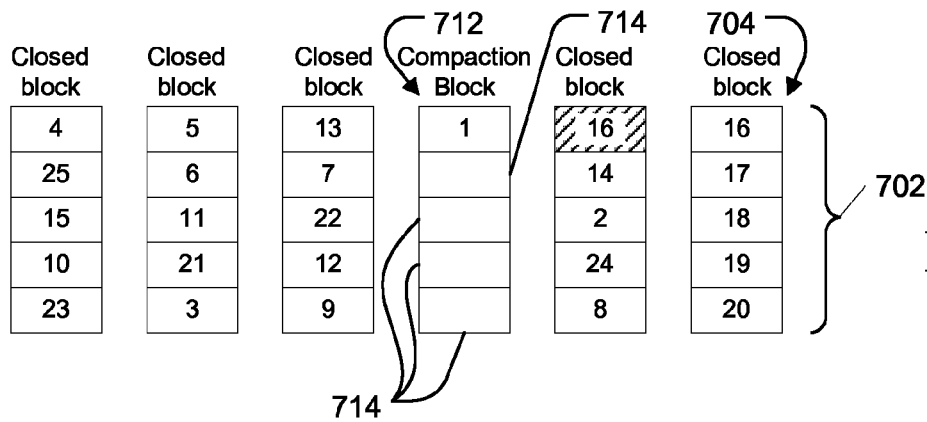
Figure 7G:
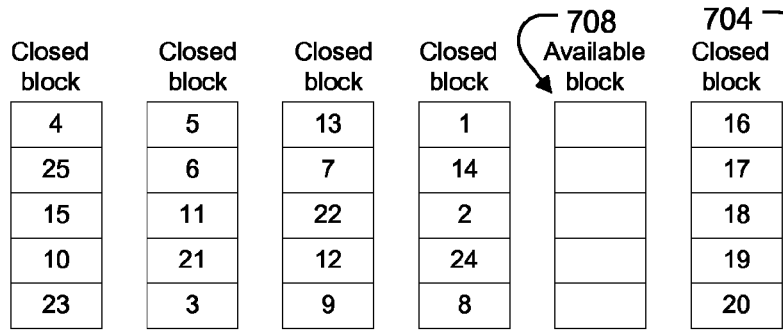

Assuming that the memory is substantially full, in this example five separate compaction operations are needed to free up space for the next write (to free up a block with five logical groups of space). This sequence of compaction steps is illustrated in FIGS. 7C-7G. Compaction is an internal housekeeping process of taking valid data already in the main storage, copying any valid data from a completed block (i.e., a previously fully written block that is now closed but has had some data made obsolete by updated information stored in another block), and writing only the valid data into a new block, also referred to as a compaction block 712, so the previous block can be erased and reused. In one implementation of the compaction process, the controller would typically first select the block with the least amount of valid data and continue the process in that manner. In the idealized example of FIGS. 4A-4G, each block has a single obsolete logical group so the process of compaction is shown progressing sequentially through the different blocks. Thus, in FIG. 4C, the valid data may be copied to a new block with one free logical group 714 (for example a metapage) available for the next write operation. In FIG. 7D, the second block is compacted, copying the first valid logical group in to the unwritten space of the first compacted block and the remainder into a new block leaving space for two free logical groups. The process of compacting each of the affected blocks continues in FIGS. 7E-7G until an entire block of free space is freed up. In this example, one write led to five separate compaction steps to free up a new block because the sequentially numbered set of logical groups (16-20) that were updated as part of a write to the main storage were discontiguously located in five separate different blocks.

Figure 8A:
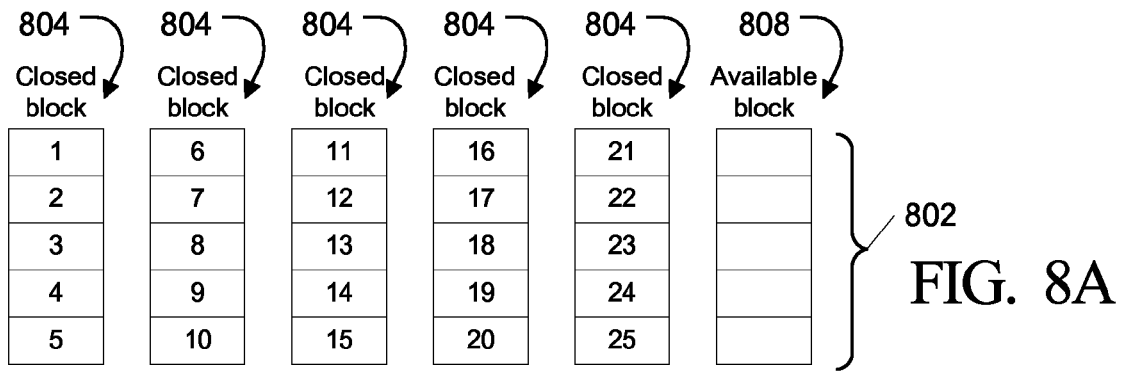
FIGS. 8A-8C illustrates an example sequence of data write and housekeeping operations in a memory that is pre-sorted by logical groups.
Figure 8B:
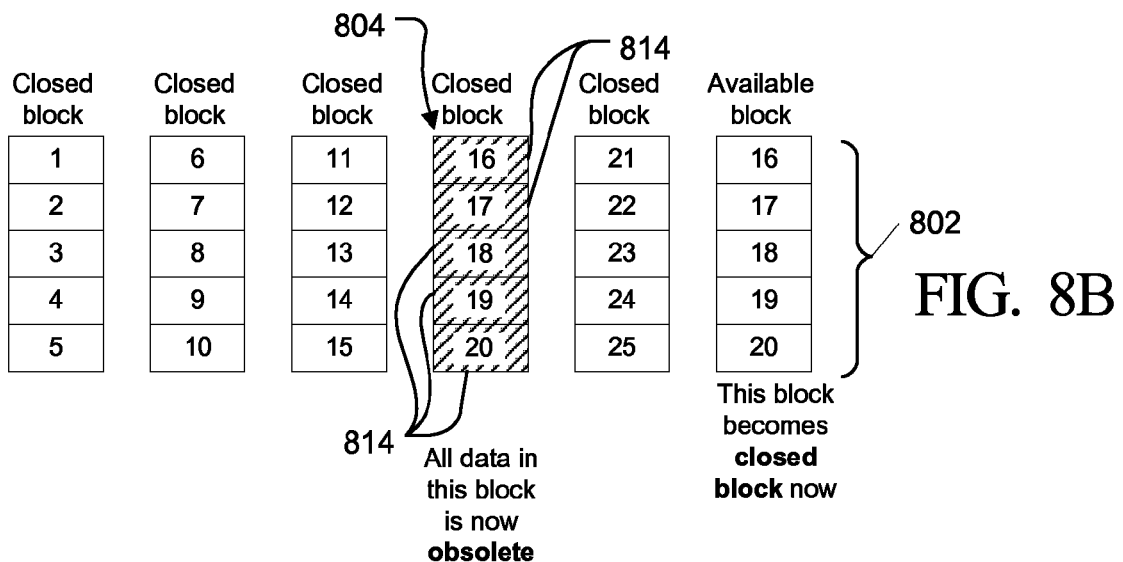
Figure 8C:

In contrast, a combination proactive and reactive defragmentation process as disclosed herein may greatly reduce the fragmentation of logical groups in the memory and thus reduce the number of housekeeping steps needed to free up additional blocks. An example of a set of blocks 802 in main storage, for example MLC flash memory, having ideally defragmented logical groups is illustrated in FIGS. 8A-8C. In FIG. 8A, the logical groups have been maintained in sequential order and are contiguously located in closed blocks 804. Referring to FIG. 8B, when data is written to this memory, for example the same run of logical groups 16-20 as used in the prior illustration of FIGS. 7A-7G above, only one block in the memory contains obsolete data 814. The controller of the storage device may then simply erase the block with the obsolete data to free up a new block 808, as shown in FIG. 8C, without having to do any compaction operations. Although the examples of a memory without sorted logical groups (FIGS. 7A-7G) and one with sorted logical groups (FIGS. 8A-8C) are simplified and idealized examples, the potential benefits of presorting the data are apparent. A storage device that is becoming full and needs to write a relatively long run of data corresponding to sequentially numbered logical groups may reduce the number of housekeeping operations needed when the memory is sorted (defragmented) as compared to an unsorted (fragmented) memory.

In order to achieve a desired level of defragmentation, a method of managing the memory of a storage device is now described. This method may utilize the storage device 102 of FIG. 1, and be implemented based on hardware, firmware or software, for example processor executable instructions maintained in controller memory 112 or elsewhere, in the storage device 102.

Figure 9:
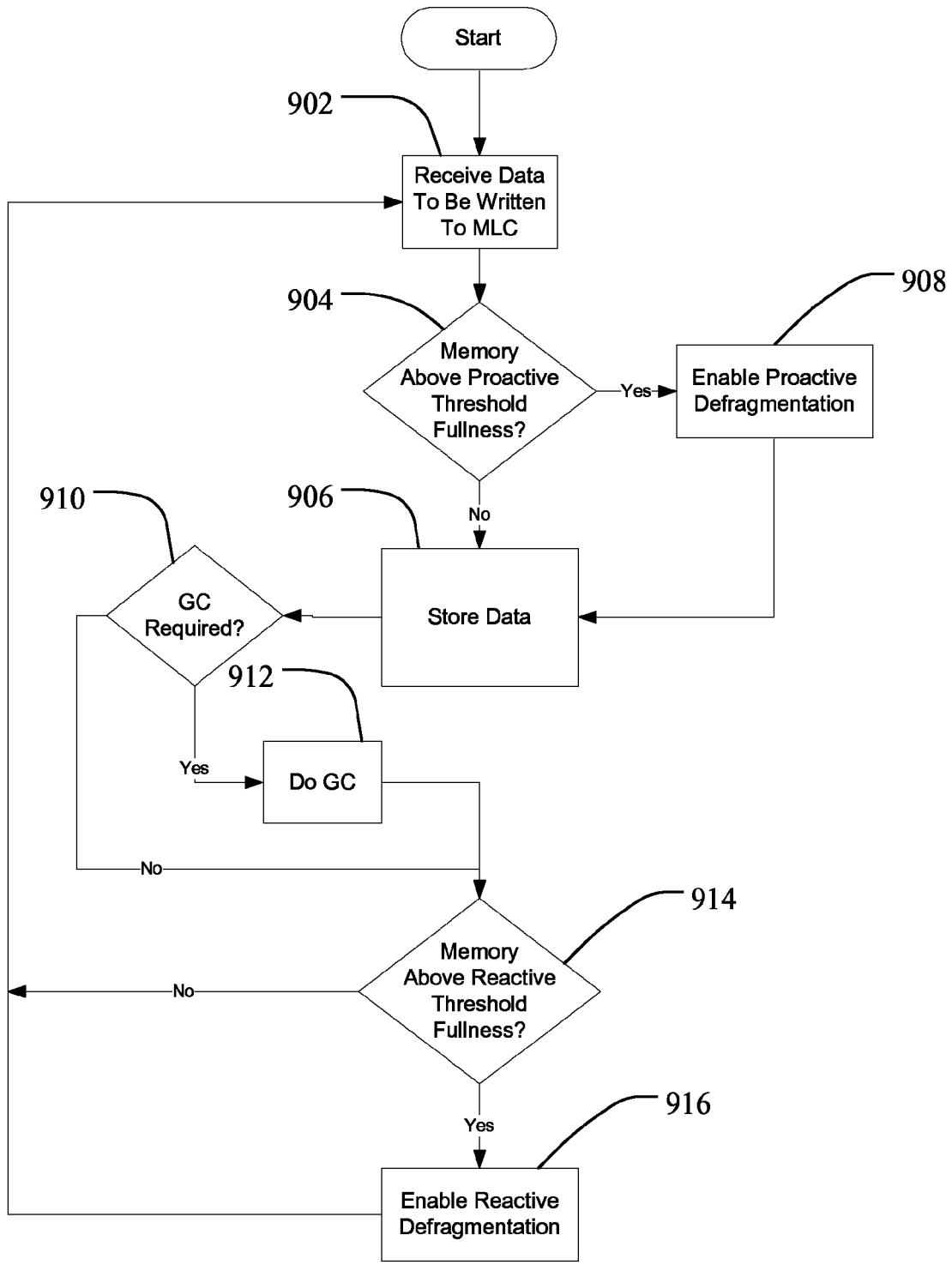
FIG. 9 is a flow chart illustrating a combined proactive and reactive defragmentation process.

Referring to FIG. 9, a data write may be received for writing to the main storage 120 of the flash memory 108 (at 902). The data write may be sequentially ordered logical groups received from any source, external or internal to the storage device. Examples of data writes include sequential host writes containing sequentially ordered logical groups received directly from the host system 100 and directed by the controller 106 to main storage, eviction of data from the binary cache 132 to the main storage 120, a binary working set (BWS) folding operation internal to the storage device 102 from the SLC pool 134 to an MLC eviction block, or any other source of sequential data (or a very long random write command that appears to the storage device to be sequential) for writing to the MLC blocks in main storage 120. Because fragmentation in the main storage 120 may not present any performance problems to the storage device 102 until the storage device has reached a certain fullness, and because defragmentation processes can take up processing resources of the storage device, the controller may check the fullness of the storage device to see if a proactive defragmentation threshold fullness has been reached before enabling proactive defragmentation so that the process of proactive defragmentation process described in more detail below is only used when the memory fullness has reached a desired threshold (at 904, 908). If the proactive threshold fullness has not been reached, then the data is stored in MLC without any special defragmentation processing (at 906). In addition to the contribution to fragmentation that host writes can have, the standard flash memory management process of compaction (also referred to as garbage collection (GC)), such as where the controller decides that a threshold amount of obsolete data is present, or that too few blocks are available, and then consolidates data to free up more blocks, may also lead to fragmentation (at 910, 912). Because garbage collection itself causes fragmentation in addition to fragmentation caused by storage of new data, it will need to be addressed by reactive defragmentation.

Also, as noted in FIG. 9, reactive (post-write) defragmentation processes do not need to be implemented until the main memory reaches a reactive defragmentation threshold fullness (at 914). In one embodiment, the threshold memory fullness for enabling both the proactive and reactive defragmentation processes may be the same, for example 50% fullness, so that they are enabled at essentially the same time. In other embodiments, threshold fullness of the memory may be lower for enabling proactive defragmentation than for enabling reactive defragmentation such that no defragmentation process is enabled until the proactive threshold fullness is reached in the memory, then proactive defragmentation alone is enabled until the point where the memory has reached the reactive threshold fullness so that both proactive and reactive defragmentation are enabled (at 916). In yet other embodiments, the threshold fullness for reactive defragmentation may be lower than that of proactive defragmentation so that only reactive defragmentation is enabled. Alternatively, the storage device may be configured to only include a capability for one of reactive defragmentation or proactive defragmentation.

Utilizing a storage device such as illustrated in FIG. 1, a proactive defragmentation process is described. The proactive defragmentation process involves the controller 106 identifying logical groups of data that may be sequentially written to MLC memory 120 to avoid the need to later trigger a reactive (post-write of the logical groups in MLC) defragmentation process through periodic or actively tracked triggering mechanisms. Unlike the reactive defragmentation process that, when enabled, may only actually trigger scanning and/or copying of fragmented logical groups already written to main storage (MLC) based on a separate threshold, the proactive defragmentation process is always active once enabled. Proactive defragmentation encompasses the grouping of writes to be written to MLC such that the level of MLC cluster fragmentation in main memory is minimized or unchanged by the write operation.

As discussed below, the proactive defragmentation process is biased towards leaving the data in the storage device either unchanged (i.e., the original data was not fragmented) or naturally defragments data as a write occurs. Also, although either process (proactive or reactive) may be implemented on its own, proactive defragmentation is usually used in cooperation with reactive defragmentation because it is common, in any particular system, for there to be some route data may take to an MLC metablock that is not proactively defragmented. Thus, some amount of gradual fragmentation may need to be accounted for with a reactive defragmentation process.

Figure 10:
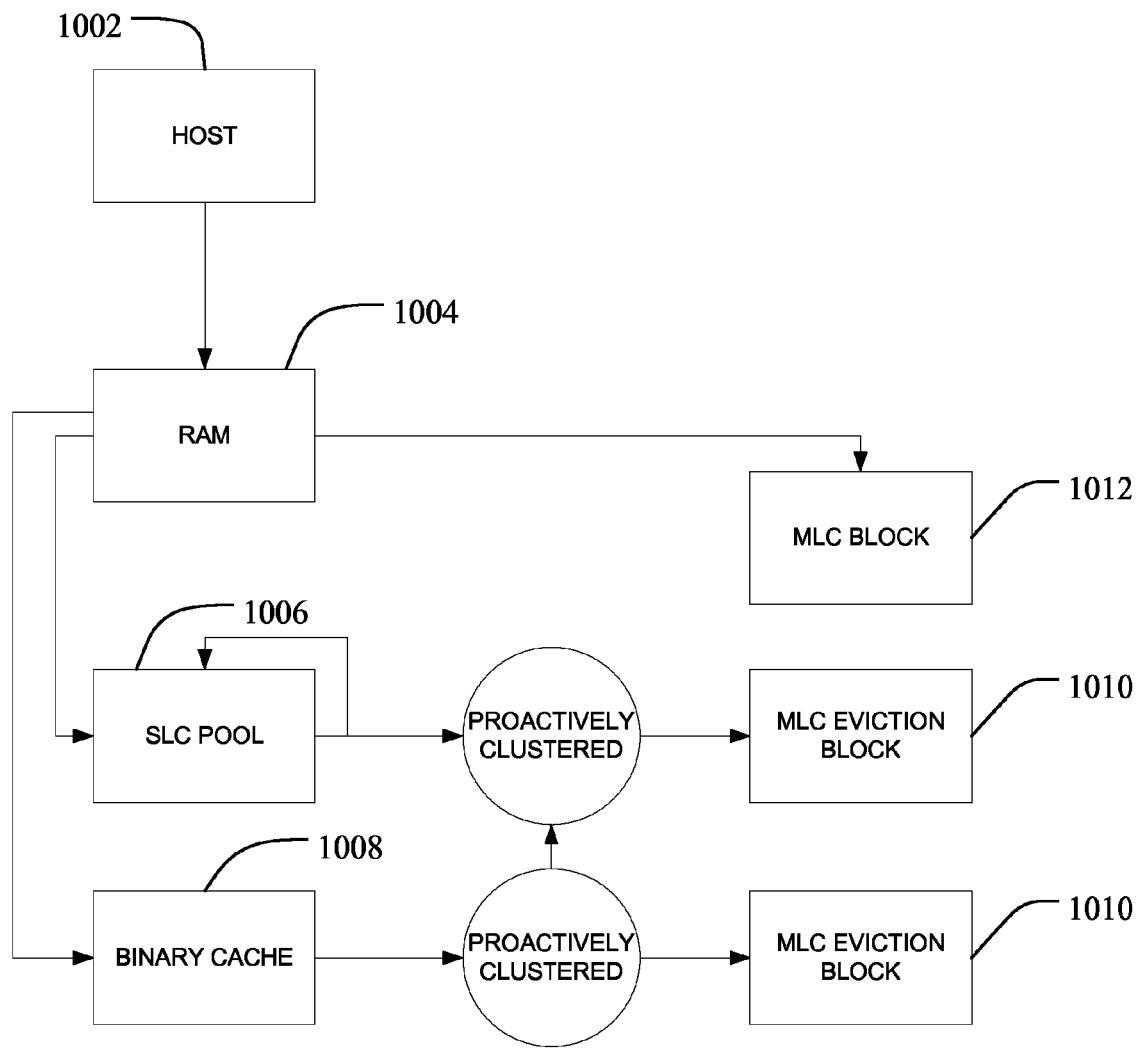
FIG. 10 is a flow chart of one method of controlling storage of content to sort logical groups using proactive defragmentation.

In proactive defragmentation, the storage device works to initially write logical groups of new host data into MLC in a sequential manner so as to avoid or minimize creation of fragments of clusters. As illustrated in FIG. 10, proactive defragmentation is primarily, but not necessarily limited to, data from new commands from a host 1002 being written to MLC either directly or by logical group eviction from SLC. To implement proactive defragmentation through logical group eviction from SLC, the controller 106 of the storage device may look at evicting data from the SLC pool 1006 or data fragments, where data fragments consist of valid host data that has been written in lengths less than a LG, from the binary cache 1008. When the controller evicts logical groups from binary cache 1008 or the SLC pool 1006, it proactively clusters the fragments of data into full sequential clusters of data and writes the sequential clusters of logical groups to an MLC eviction block 1010. Thus, each of these clusters contains sequentially ordered collections of logical groups, for example sectors, which are then written to MLC and do not create any fragmentation in MLC. The eviction of data from the SLC pool 1006 and binary cache 1008 may be done in concert so that sequential logical groups gathered from both the SLC pool and binary cache may be aggregated into a cluster and stored in the same MLC eviction block 1010 in the main storage area of the storage device.

To accomplish proactive defragmentation using SLC eviction, the controller 106 may look for patterns of data in the binary cache 1008 and SLC pool 1006 and, upon coming across a complete cluster's worth of sequential and contiguous logical groups (where a LG cluster is defined as some multiple of sequential LGs that may or may not be the same as the number of LGs that can be stored in an MLC block) may write the sectors from the binary cache 1008 and SLC pool 1006 that together make a complete cluster into MLC. In one embodiment, the controller 106 may look for the patterns of sequentially addressed logical groups in the binary cache 1008 and SLC pool 1006 by parsing the one or more logical-to-physical mapping tables maintained in the storage device, such as the group address table (GAT) 126 and the binary cache index (BCI) 136 maintained in the storage device 102. The controller 106 may immediately evict a cluster's worth of sequential logical groups as soon as a complete sequential cluster is collected, or the eviction may instead be on a periodic basis. In other embodiments, the number of logical groups that are grouped and evicted as part of the proactive defragmentation process may be less than a complete cluster and this number may be fixed or dynamic, where the number may be changed during operation based on storage device statistics.

The collection of logical groups in a cluster is preferably composed of contiguously and sequentially addressed logical groups. In storage devices supporting sub-logical group TRIM commands, however, the logical groups of a complete non-fragmented cluster may actually be discontiguous. A TRIM (or a logical erase) command is a command that a host can issue to a storage device informing the storage device that certain data in sets of logical ranges are not required by the host operating system. Data in these identified ranges can then be discarded by the drive if it is advantageous to do so. Thus, where the controller 106 of the storage device 102 knows that intervening logical group addresses do not exist due to information from a TRIM command, the logical groups may be discontiguous and still be considered non-fragmented. For example, rather than a ten sector cluster where sectors addressed 0-9 are contiguous and in sequence, a complete defragmented cluster may also be considered, for TRIM'd data, a collection of logical groups addressed 0-5 and 7-10 where logical group address 6 is known not to exist.

Proactive defragmentation may, in addition to the path from a binary cache 1008 and/or SLC pool 1006 to an MLC eviction block 1010, include a direct host write to an MLC block 1012. A direct host write to MLC may be determined by the controller 106 of the storage device 102 tracking the destination address for incoming data and, at a point where a certain number of sequential writes have occurred, directing host writes straight to MLC memory because the assumption is that subsequent host writes will also be coming in sequence. By directing, it is meant that the controller of the storage device receives the data from the host in temporary memory, such as RAM 1004, and then, after reviewing the logical block address for that data directs the data straight to an MLC block 1012 in main memory 120.

Depending on the protocol utilized by the storage device, the storage device may or may not receive advance notice of the number of sequential sectors a host is about to write. In instances where the controller 106 of the storage device does receive information from a host that a certain number of sequentially addressed sectors is about to be written, the controller 106 may proactively defragment the MLC memory by routing the sequentially addressed host write directly to MLC blocks in the main storage of the storage device in groups that sectors that will preferably only fill up complete clusters. Any remainder of the sequentially addressed sectors for that write operation that does not make up a complete cluster may be directed by the controller to binary cache and/or the SLC pool.

Alternatively, in instances where the storage device 102 does not receive advance information from the host 100 concerning the number of sequential sectors about to be written, or in cases where advance information is available, but the host writes are very short, the storage device 102 may monitor a sequence of writes and make a determination of whether data should go directly to MLC rather than to binary cache or the SLC pool. For example, in a situation where a cluster size equals ten sectors of data and where a series of host write commands are arriving for single sector writes, the controller 106 may monitor the writes and over time make a determination that the writes should be made directly to MLC 120. The first short burst of data may be directed to the binary cache 132. If the next single sector writes continue with sequentially addressed sectors, the controller 106 may direct the next sequence of continued sequential writes to the SLC pool 134. Then, upon reaching a threshold number of sequentially addressed sectors in separate prior write commands, the controller 106 may predict that subsequent writes will continue the sequentially addressed stream of logical groups. At this point, the controller may then direct the subsequent short writes to MLC 120 until the controller sees that there is a break in the sequential addresses of data being received.

The decision by the controller to direct data writes which contain sequentially addressed sectors, but less than a full cluster's worth of sectors in any given write, may be simply a threshold number of sectors received in sequential order as described above, or may be based on other or additional criteria. For example, one or more host writes are contiguous to data written in SLC pool 134, data in the binary cache 132 or data already residing in an open (currently being written) MLC block such that merging the data proactively defragments MLC while also carrying out necessary garbage collection at the same time (e.g. evicting data from the SLC pool and the binary cache). Regardless, the controller's decision to begin writing short writes directly to MLC rather than to the binary cache 132 or elsewhere is made on the assumption, where the assumption may be implemented on the basis of a threshold number of sequential LGs recently detected, that it is likely each of the next writes will also be in sequence. When the next logical group of data received at the storage device in RAM 114 is for a non-sequential address, that data associated with that address may be directed towards binary cache. The point at which sequential writing from the host stops may not coincide with a cluster boundary and a cluster that was being written sequentially in MLC may then be unfinished and a fragment created.

For each unfinished cluster that ends as a result of the end of a direct to MLC write process, and for each fragment that is created in MLC 120 due to deletions and writing of data in more than one physical metablock, a counter is incremented by the controller 106 in the storage device 102. At certain points, the reactive defragmentation process may be required because the proactive defragmentation process may only maintain defragmentation up to a certain point. When fragments have been created in MLC memory due to the various other ways data can make it into MLC or be deleted and rewritten at different times, the reactive, or post-write, defragmentation can help to further remove and reduce fragments.

As discussed with respect to FIG. 9 above, reactive defragmentation is first enabled when the main memory fullness reaches a predetermined threshold that may or may not be the same as that of the threshold for enabling proactive defragmentation. Once enabled, the reactive defragmentation process can be triggered in two main ways: periodic triggering and active triggering. Periodically triggered reactive defragmentation may be scheduled to occur after a predetermined number of fragmenting writes to MLC, or at other time intervals, so that there is a scan of the device to find fragmented clusters when the write count or time period has elapsed. Additionally, reactive defragmentation may be triggered by actively tracking cluster fragmentation levels for individual clusters and/or the overall storage device. Reactive defragmentation is achieved by copying logical groups resident in MLC into a separate destination metablock. This defragmentation block may be distinct from any metablocks used in a compaction process, or a same block may be used to receive both compacted data and defragmented data (see FIGS. 5-6).

Figure 11:
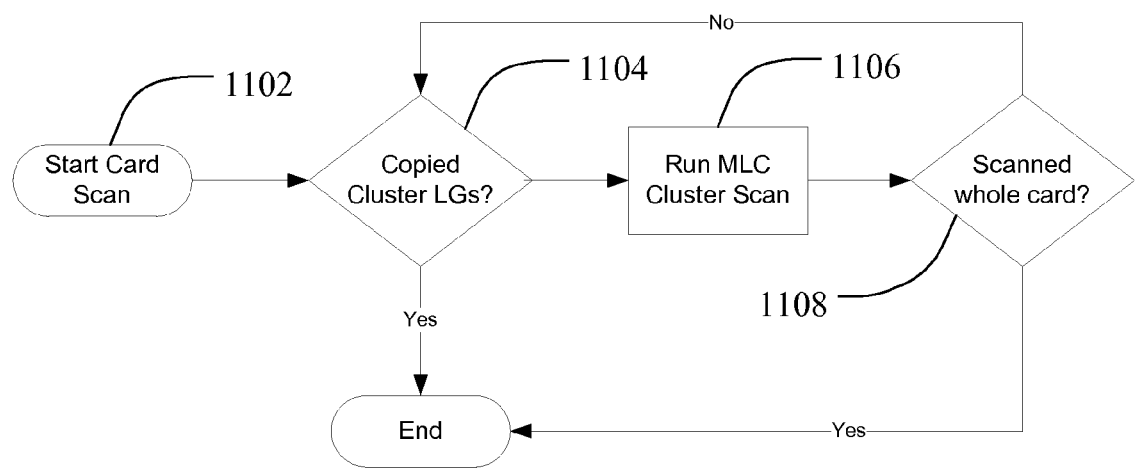
FIG. 11 is a flow chart illustrating a reactive defragmentation process that may be used in conjunction with the proactive defragmentation process of FIG. 10.

Referring to FIG. 11, an overview of a reactive defragmentation process is described. First, when the trigger point (periodic or active) is reached to begin reactive defragmentation the storage device is scanned (at 1102). Scanning of the storage device comprises reviewing the logical to physical table information in the BCI 136, GAT 126 or other logical-to-physical mapping tables for the binary cache 132, the SLC pool 134, and the MLC memory 120. In one implementation, for defragmentation to be more effective, a minimum number of logical groups should be copied and re-written to a new block in MLC. For example, one minimum number of logical groups may be set at a cluster's worth of logical groups. Thus, a check is made during the reactive defragmentation process to see if an entire cluster of logical groups has been copied at each point of a logical group copy to make sure that the minimum amount of defragmentation will take place (at 1104). Assuming that a number of logical groups that makes up an entire cluster's worth of logical groups has not been copied in the defragmentation process yet, clusters are scanned, via the logical to physical mapping tables, to determine if they have valid logical groups stored in MLC eligible to be copied into a new defragmentation metablock (at 1106). An example of the scanning process for each cluster is described below with respect to FIG. 12.

Referring again to FIG. 11, after scanning the entire card the process ends (at 1108). Alternatively, until the entire card is parsed, the controller of the storage device keeps scanning for logical groups to copy until at least one cluster's worth of logical groups has been copied into a defragmentation block. Thus, the process repeats until either the entire card is scanned or at least one cluster's worth of logical groups has been copied. One reactive defragmentation process that may be used is disclosed in U.S. application Ser. No. 13/338,941, filed Dec. 28, 2011, the entirety of which is incorporated by reference herein.

Figure 12:
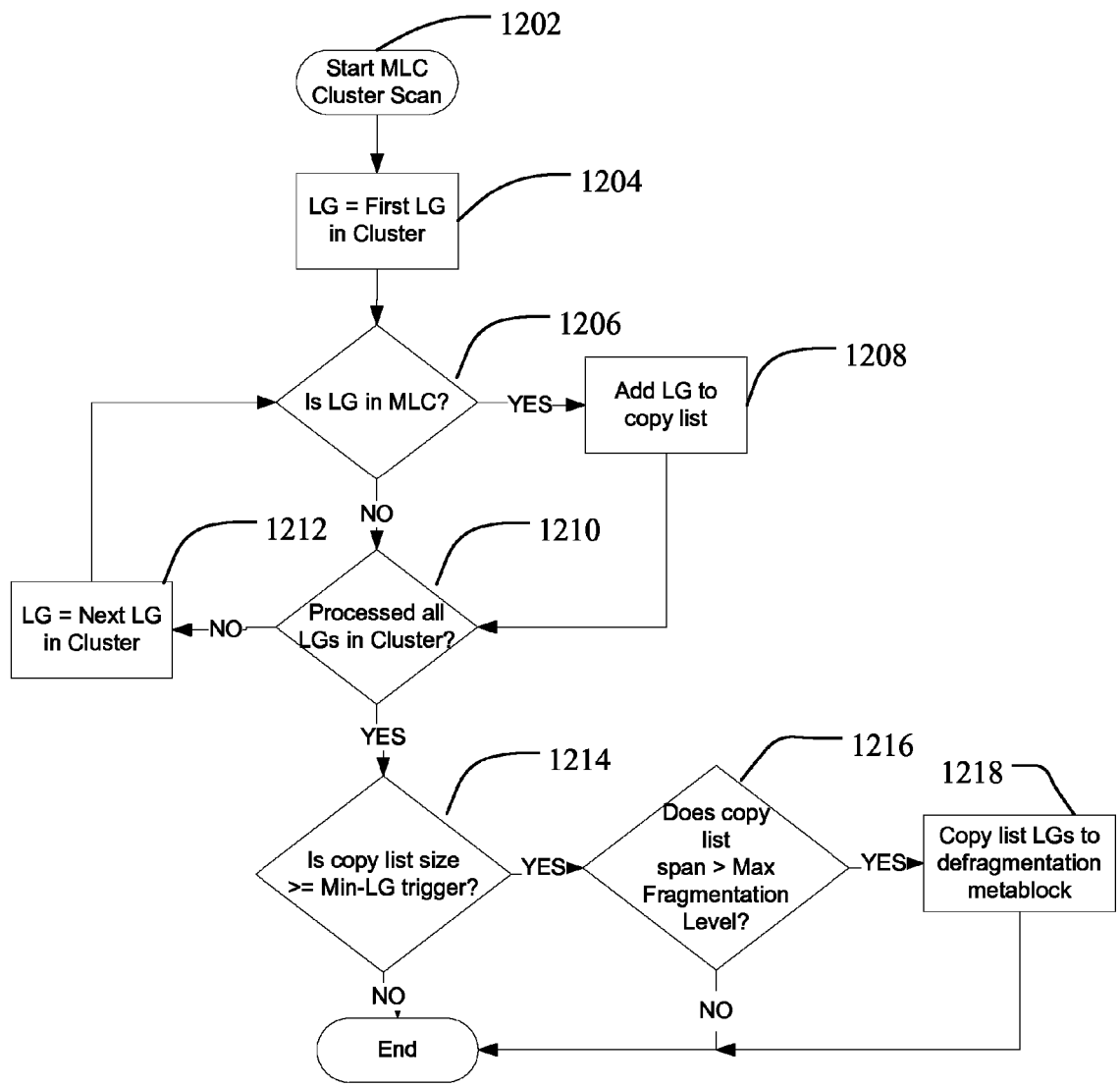
FIG. 12 is a flow chart expanding on the reactive defragmentation process of FIG. 11.

The step of executing the MLC cluster scan (step 1106 of FIG. 11) is expanded on in FIG. 12 and includes starting the MLC cluster scan at the first logical group in a selected cluster and determining if the logical group is in MLC (at 1202, 1204). The controller may select the first cluster to scan as the cluster immediately after the last one scanned during reactive defragmentation or it may pick a random cluster from somewhere across the storage device. In one embodiment, the controller may be configured to bias to do X % of cluster scans randomly, where X is configurable from zero to 100%. The rest may be from the last cluster that was not randomly scanned. Again this is obtained by scanning logical to physical address tables. Only fragmentation in the MLC is addressed in this process. If the logical group is not in MLC then the controller of the storage device determines whether all logical groups in the cluster have been processed yet (at 1206, 1210). If not, the address is incremented to look for the next logical group in the cluster and again the logical group is checked to see if it is in the MLC (at 1212, 1206). When a valid logical group is found in the MLC memory then the logical group address is added to a copy list (at 1208). After finishing all the logical groups in the cluster then the copy list size is checked to see if it is greater than or equal to a minimum logical group trigger size (at 1210, 1214).

The defragmentation of a cluster may only be desired if at least a minimum number of logical groups require defragmentation for the cluster. For example, the reactive defragmentation trigger size may be, for a storage device having clusters made up of ten logical groups, at least four logical groups in the list. Assuming that the copy list size is greater than or equal to minimum logical group trigger then the storage device determines whether the logical groups found for that cluster are spread over more than a threshold amount of fragmentation that is tolerated in the MLC (at 1214, 1216). If the logical groups are spread over more than the threshold number of blocks then the logical groups in that list are copied to a defragmentation metablock in sequential order to remove the fragmentation of those logical groups (at 1218). If not, the process ends and, returning to FIG. 11, the rest of the card is scanned and the process continues.

As part of the proactive and reactive defragmentation processes described herein, different counters may be maintained by the controller to track logical groups, metapages, or some other increment of data in other implementations. Counters may be used to determine the number of fragmentation writes that have been made by the controller 106 to MLC 120, for example when a write of contiguously addressed logical groups of data ends at a point in the middle of a cluster rather than at a cluster boundary (i.e., when more than a cluster of continuously addressed logical groups has been written but the total sequential write is less than a whole number multiple of clusters). Such a fragmentation write counter may be used against a threshold to trigger the reactive defragmentation process. The counters may be maintained in controller RAM 114, or in the flash memory 108 to protect against power loss, or based on RAM capacity issues. The counters may be stored with logical group sort data 128 in the SLC memory 118.

After data is received and the relevant counters updated, one or more counters may be compared to the relevant threshold information for that counter. The thresholds may be fixed or may be dynamic. The thresholds may be set at an initial default amount and then adjusted according to changes in operating status of the memory, such as the fullness of the storage device, or other parameters. The adjustments to a threshold may be based on an algorithm or simply looked up from a data structure in memory. Examples of tunable parameters for adjusting the reactive defragmentation process include the number of trigger sectors (the number of fragmenting MLC writes that trigger a defragmentation scan of the storage device), the size of the MLC cluster being tracked (the number of LGs making up a cluster—which will affect fragmentation level calculations), the minimum number of LGs that have to be resident in the MLC within a cluster for that cluster to be copied for defragmentation purposes (Min-LG trigger), the maximum allowable number of MLC blocks that an MLC cluster is permitted to be spread over before it is considered for copying to defragment (Max-Fragmentation), and the minimum number of LGs that must be copied per triggered cluster scan.

Depending on the size of the blocks used in the storage device 102 and the current threshold number of logical groups that is being scanned for, a write of sequential logical groups to a new block may not completely fill up a new block or a whole number of new blocks. In one implementation, the controller 106 may then write dummy data to fill up the remainder of the new block and avoid further fragmentation. In another implementation, the controller 106 will not write dummy data and will instead use any remaining space in the new block for use in the next host write. Also, in other embodiments, the scanning of the main storage 120 for fragmentation (sequential but discontiguously stored logical groups) and/or the act of re-writing the fragmented logical groups sequentially and contiguously in one or more new blocks, may be part of a larger memory management scheme that prioritizes garbage collection and other housekeeping operations to maintain a desired level of performance for the storage device.

The method and system described above for preventing or reducing fragmentation may be implemented on a removable or standalone storage device or memory embedded in a host. Techniques for implementing proactive defragmentation, or a combination of proactive and reactive defragmentation have been described. Although proactive defragmentation may be always enabled, it is contemplated that proactive defragmentation is only enabled when the fullness of the main memory reaches a proactive threshold, at which point the controller will only direct data with sequentially addressed logical groups to the main memory. The data destined for the main memory may be directly received from a host, previously received data that is stored outside main memory, for example an SLC pool data or binary cache data. The controller may track the LG address information for data from any combination of these sources only write sequential and contiguous runs of LGs to the main memory to maintain or reduce the fragmentation level in the main memory.

A has also been described, the process of proactive defragmentation may be supplemented by reactive defragmentation that scans already stored LGs in main memory and copies data for sequentially addressed LGs from various locations in MLC into a MLC defragmentation block. Although the defragmentation process will then trigger a need for a separate compaction process to reclaim the invalid data left behind in various physical blocks by the copying of select LGs from those blocks during reactive defragmentation, the fragmentation of data in the main memory may be further reduced by the reactive defragmentation. Reactive defragmentation may be enabled at the same or a different drive fullness level as proactive defragmentation, and the frequency of scanning or the number of LGs moved by the defragmentation process at any one time may be dynamically adjustable based on factors such as the number of fragmenting writes detected, the level of fullness of the drive past the initial enabling threshold, the overall fragmentation of the drive and other criteria. The enabling, scanning and copying or writing tasks that make up the proactive and reactive defragmentation processes may be implemented in hardware, or as software or firmware executable by a processor of the storage device.

An advantage of the disclosed method and system is that write performance may be improved where write amplification is reduced and a higher percentage of time may be spent on writing data rather than making room for data. For example, as illustrated in FIGS. 7A-7G, a memory that is not sorted and that receives a long data write of sequential data, may need to spend an excessive amount of time executing multiple data compaction steps to free space as the memory fills up. In contrast, as illustrated in FIGS. 8A-8C, proactive and reactive defragmentation of logical groups, such as by the techniques disclosed herein, can reduce the need for compaction or other housekeeping operations to make sure blocks may be freed up for subsequent writes.

It is therefore intended that the foregoing detailed description be regarded as illustrative rather than limiting, and that it be understood that it is the following claims, including all equivalents, that are intended to define the spirit and scope of this invention.

What is claimed is:

1. A method of controlling storage of content on a storage device, the method comprising:
   in a storage device having a controller in communication with non-volatile memory, wherein the non-volatile memory comprises a first type of non-volatile memory and a second type of non-volatile memory, the controller:
   receiving data for storage in the non-volatile memory;
   upon determining that a fullness of the storage device has reached a proactive defragmentation threshold, only writing sequentially addressed logical groups of received data to the second type of non-volatile memory, wherein only writing sequentially addressed logical groups of received data to the second type of non-volatile memory comprises the controller:
      determining if the received data contains at least a threshold number of sequentially addressed logical groups and, when the received data is determined to contain at least the threshold number of sequentially addressed logical groups, bypassing the first type of non-volatile memory and writing the sequentially addressed logical groups of received data directly into the second type of non-volatile memory; and
      when the received data is determined to contain less than the threshold number of sequentially addressed logical groups, writing the received data into the first type of non-volatile memory; and
   upon determining that the fullness of the storage device has reached a reactive defragmentation threshold automatically defragmenting data already written into the second type of non-volatile memory in response to a triggering event.

2. A method of controlling storage of content on a storage device, the method comprising:
   in a storage device having a controller in communication with non-volatile memory, wherein the non-volatile memory comprises a first type of non-volatile memory and a second type of non-volatile memory, the controller:
   receiving data for storage in the non-volatile memory;
   upon determining that a fullness of the storage device has reached a proactive defragmentation threshold, only writing sequentially addressed logical groups of received data to the second type of non-volatile memory;
   wherein only writing sequentially addressed logical groups of received data to the second type of non-volatile memory comprises the controller:

monitoring the first type of non-volatile memory for previously received data having the threshold number of sequentially addressed logical groups; and writing an amount of sequentially addressed logical groups of data from the first type of non-volatile memory to the second type of non-volatile memory data when at least the threshold number of sequentially addressed logical groups is found in the first non-volatile memory type;

and upon determining that the fullness of the storage device has reached a reactive defragmentation threshold automatically defragmenting data already written into the second type of non-volatile memory in response to a triggering event.

3. A method of controlling storage of content on a storage device, the method comprising:

in a storage device having a controller in communication with non-volatile memory, wherein the non-volatile memory comprises a first type of non-volatile memory and a second type of non-volatile memory, the controller:

receiving data for storage in the non-volatile memory;

upon determining that a fullness of the storage device has reached a proactive defragmentation threshold, only writing sequentially addressed logical groups of received data to the second type of non-volatile memory;

wherein only writing sequentially addressed logical groups of received data to the second type of non-volatile memory comprises the controller:

determining if the received data contains at least a threshold number of sequentially addressed logical groups and, when the received data is determined to contain at least the threshold number of sequentially addressed logical groups, bypassing the first type of non-volatile memory and writing the sequentially addressed logical groups of received data directly into the second type of non-volatile memory;

when the received data is determined to contain less than the threshold number of sequentially addressed logical groups, writing the received data into the first type of non-volatile memory;

monitoring the first type of non-volatile memory for data having the threshold number of sequentially addressed logical groups; and writing at least the threshold amount of sequentially addressed logical groups of data from the first type of non-volatile memory to the second type of non-volatile memory data when at least the threshold number of sequentially addressed logical groups is found in the first non-volatile memory type;

and upon determining that the fullness of the storage device has reached a reactive defragmentation threshold automatically defragmenting data already written into the second type of non-volatile memory in response to a triggering event.

4. The method of claim 2, wherein the controller determines if the received data contains at least the threshold number of sequentially addressed logical groups based on host information received prior to a host write command, the host information comprising an indicator of a number of sequential logical groups of data to be written next.

5. The method of claim 2, wherein the controller determines if the received data contains at least the threshold number of sequentially addressed logical groups based on monitoring a host write pattern and determining that a last sequence of host writes has provided sequentially addressed logical groups of data in an amount equal to or greater than the threshold number of sequentially addressed logical groups.

6. The method of claim 1, wherein automatically defragmenting data already written into the second type of non-volatile memory comprises the controller:

scanning the second type of non-volatile memory for sequentially numbered logical groups of data previously written in noncontiguous locations in the non-volatile memory; and if a threshold amount of sequentially numbered logical groups previously written in noncontiguous locations are present, re-writing at least the threshold amount of sequentially numbered logical groups of data contiguously into a new block in the second type of non-volatile memory.

7. The method of claim 6, wherein scanning the second type of non-volatile memory for sequentially numbered logical groups of data previously written in noncontiguous locations in the non-volatile memory comprises the controller:

determining a number of valid logical groups stored in the second type of non-volatile memory that are associated with a particular cluster; and determining a number of blocks in the second type of non-volatile memory containing the valid logical groups associated with the particular cluster.

8. The method of claim 7, further comprising the controller re-writing the valid logical groups of data associated with the particular cluster contiguously into a new block in the second type of non-volatile memory when both the number of valid logical groups is greater than a logical group threshold and the number of blocks in the second type of non-volatile memory containing the valid logical groups is greater than a fragmentation threshold.

9. The method of claim 1, wherein the first type of non-volatile memory comprises single level cell (SLC) flash memory and the second type of non-volatile memory comprises multi-level cell (MLC) flash memory.

10. The method of claim 6, wherein the trigger event comprises a number of fragmenting write operations exceeding a fragmenting write operation threshold.

11. The method of claim 6, wherein automatically defragmenting data already written into the second type of non-volatile memory further comprises exclusively re-writing data into the new block, wherein the new block is dedicated to only defragmented data.

12. The method of claim 6, further comprising separately writing compacted data into the new block in addition to automatically defragmenting data already written into the second type of non-volatile by re-writing data into the new block, wherein the new block is dedicated to both defragmented data and data received from a compaction process.

13. A storage device comprising:

a non-volatile memory having a first type of non-volatile memory and a second type of non-volatile memory; and a controller in communication with the non-volatile memory, the controller configured to:

receive data for storage in the non-volatile memory;

upon a determination that a fullness of the storage device has reached a proactive defragmentation threshold, only write sequentially addressed logical groups of received data to the second type of non-volatile memory;

wherein to only write sequentially addressed logical groups of received data to the second type of non-volatile memory, the controller is further configured to:
  determine if the received data contains at least a threshold number of sequentially addressed logical groups and, when the received data is determined to contain at least the threshold number of sequentially addressed logical groups, bypass the first type of non-volatile memory and write the sequentially addressed logical groups of received data directly into the second type of non-volatile memory; and
  when the received data is determined to contain less than the threshold number of sequentially addressed logical groups, write the received data into the first type of non-volatile memory;
and
upon a determination that the fullness of the storage device has reached a reactive defragmentation threshold, automatically defragment data already written into the second type of non-volatile memory in response to a trigger event.

14. A storage device comprising:
a non-volatile memory having a first type of non-volatile memory and a second type of non-volatile memory; and
a controller in communication with the non-volatile memory, the controller configured to:
receive data for storage in the non-volatile memory;
upon a determination that a fullness of the storage device has reached a proactive defragmentation threshold, only write sequentially addressed logical groups of received data to the second type of non-volatile memory;
wherein to only write sequentially addressed logical groups of received data to the second type of non-volatile memory the controller is further configured to:
  monitor the first type of non-volatile memory for previously received data having the threshold number of sequentially addressed logical groups; and
  write an amount of sequentially addressed logical groups of data from the first type of non-volatile memory to the second type of non-volatile memory data when at least the threshold number of sequentially addressed logical groups is found in the first non-volatile memory type;
and
upon a determination that the fullness of the storage device has reached a reactive defragmentation threshold, automatically defragment data already written into the second type of non-volatile memory in response to a trigger event.

15. A storage device comprising:
a non-volatile memory having a first type of non-volatile memory and a second type of non-volatile memory; and
a controller in communication with the non-volatile memory, the controller configured to:
receive data for storage in the non-volatile memory;
upon a determination that a fullness of the storage device has reached a proactive defragmentation threshold, only write sequentially addressed logical groups of received data to the second type of non-volatile memory;
wherein to only write sequentially addressed logical groups of received data to the second type of non-volatile memory the controller is further configured to:
  determine if the received data contains at least a threshold number of sequentially addressed logical groups and, when the received data is determined to contain at least the threshold number of sequentially addressed logical groups, bypass the first type of non-volatile memory and write the sequentially addressed logical groups of received data directly into the second type of non-volatile memory;
  when the received data is determined to contain less than the threshold number of sequentially addressed logical groups, write the received data into the first type of non-volatile memory;
  monitor the first type of non-volatile memory for data having the threshold number of sequentially addressed logical groups; and
  write at least the threshold amount of sequentially addressed logical groups of data from the first type of non-volatile memory to the second type of non-volatile memory data when at least the threshold number of sequentially addressed logical groups is found in the first non-volatile memory type; and
upon a determination that the fullness of the storage device has reached a reactive defragmentation threshold, automatically defragment data already written into the second type of non-volatile memory in response to a trigger event.

16. The storage device of claim 14, wherein the controller is configured to determine if the received data contains at least the threshold number of sequentially addressed logical groups based on host information received prior to a host write command, the host information comprising an indicator of a number of sequential logical groups of data to be written next.

17. The storage device of claim 14, wherein the controller is further configured to:
determine if the received data contains at least the threshold number of sequentially addressed logical groups based on monitoring a host write pattern; and
determine that a last sequence of host writes has provided sequentially addressed logical groups of data in an amount equal to or greater than the threshold number of sequentially addressed logical groups.

18. A storage device comprising:
a non-volatile memory having a first type of non-volatile memory and a second type of non-volatile memory; and
a controller in communication with the non-volatile memory, the controller configured to:
receive data for storage in the non-volatile memory;
upon a determination that a fullness of the storage device has reached a proactive defragmentation threshold, only write sequentially addressed logical groups of received data to the second type of non-volatile memory; and
upon a determination that the fullness of the storage device has reached a reactive defragmentation threshold, automatically defragment data already written into the second type of non-volatile memory in response to a trigger event, wherein to automatically defragment data already written into the second type of non-volatile memory in response to a trigger event the controller is configured to:
  scan the second type of non-volatile memory for sequentially numbered logical groups of data previously written in noncontiguous locations in the non-volatile memory; and
  if a threshold amount of sequentially numbered logical groups previously written in noncontiguous locations are present, re-write at least the threshold amount of sequentially numbered logical groups of data contiguously into a new block in the second type of non-volatile memory.

19. The storage device of claim 18, wherein to scan the second type of non-volatile memory for sequentially numbered logical groups of data previously written in noncontiguous locations in the non-volatile memory the controller is further configured to:
   determine a number of valid logical groups stored in the second type of non-volatile memory that are associated with a particular cluster; and
   determine a number of blocks in the second type of non-volatile memory containing the valid logical groups associated with the particular cluster.

20. The storage device of claim 19, wherein the controller is further configured to re-write the valid logical groups of data associated with the particular cluster contiguously into a new block in the second type of non-volatile memory when both the number of valid logical groups is greater than a logical group threshold and the number of blocks in the second type of non-volatile memory containing the valid logical groups is greater than a fragmentation threshold.

21. The storage device of claim 20, wherein the first type of non-volatile memory comprises single level cell (SLC) flash memory and the second type of non-volatile memory comprises multi-level cell (MLC) flash memory.

22. The storage device of claim 18, wherein the trigger event comprises a number of fragmenting write operations exceeding a fragmenting write operation threshold.

23. The storage device of claim 18, wherein the controller is configured to automatically defragment data already written into the second type of non-volatile memory further by exclusively re-writing data into the new block, wherein the new block is dedicated to only defragmented data.

24. The storage device of claim 18, wherein the controller is configured to separately write compacted data into the new block in addition to automatically defragmenting data already written into the second type of non-volatile by re-writing data into the new block, wherein the new block is dedicated to both defragmented data and data received from a compaction process.

25. A method of controlling storage of content on a storage device, the method comprising:
   in a storage device having a controller in communication with non-volatile memory, wherein the non-volatile memory comprises a first type of non-volatile memory and a second type of non-volatile memory, the controller:
   receiving data for storage in the non-volatile memory;
   upon determining that the fullness of the storage device has reached a reactive defragmentation threshold, automatically defragmenting data already written into the second type of non-volatile memory in response to a triggering event; and
   wherein automatically defragmenting data already written into the second type of non-volatile memory comprises the controller:
      scanning the second type of non-volatile memory for sequentially numbered logical groups of data previously written in noncontiguous locations in the non-volatile memory by:
         determining a number of valid logical groups stored in the second type of non-volatile memory that are associated with a particular cluster; and
         determining a number of blocks in the second type of non-volatile memory containing the valid logical groups associated with the particular cluster;
   and
      if a threshold amount of sequentially numbered logical groups previously written in noncontiguous locations are present, re-writing at least the threshold amount of sequentially numbered logical groups of data contiguously into a new block in the second type of non-volatile memory.

* * * * *